United States Patent [19]

Jo

[11] Patent Number: 5,515,999

[45] Date of Patent: May 14, 1996

[54] AUDIO CASSETTE DISPLAYER AND DISPENSER

[76] Inventor: Mahn Y. Jo, 6727 Buffalo Ave., Van Nuys, Calif. 91401

[21] Appl. No.: 408,204

[22] Filed: Mar. 22, 1995

[51] Int. Cl.⁶ ................................................. A47K 10/24
[52] U.S. Cl. ............................................. 221/45; 312/42
[58] Field of Search ............................ 221/45, 197, 33, 221/286, 282; 312/45, 60, 183

[56] References Cited

U.S. PATENT DOCUMENTS

| | | | |
|---|---|---|---|
| 3,644,010 | 2/1972 | Murphy | 312/135 |
| 4,132,329 | 1/1979 | Harrison | 221/45 |
| 4,134,495 | 1/1979 | Friedman | 206/387 |
| 4,317,603 | 3/1982 | Pepicelli et al. | 312/9 |
| 4,597,614 | 7/1986 | Alexander | 312/42 |
| 4,769,573 | 9/1988 | Celik | 312/60 |

FOREIGN PATENT DOCUMENTS 387073  6/1908  France ............................ 312/42

*Primary Examiner*—Kenneth Noland
*Attorney, Agent, or Firm*—Eugene Oak

[57] ABSTRACT

The present invention relates to an audio cassette displayer and dispenser which is able to vertically stack audio cassettes which are individually housed within cases. Audio cassettes deposited in the top of said invention may be removed one at a time through a space in the bottom of the front wall of the device. Impact-absorbing cushions are positioned on the base of the present invention to prevent damage to cassettes. Slots are provided on three of the outer walls of the device for insertion of labels and other informative matter. A hole in the top of the device allows it to be suspended on a wall by means of a nail or screw. Other means of suspension may also be utilized.

3 Claims, 3 Drawing Sheets

5,515,999

AUDIO CASSETTE DISPLAYER AND DISPENSER

BACKGROUND OF THE INVENTION

1. Field of the Invention

The present invention relates generally to an audio cassette holder and particularly to an audio cassette holder which is able to both dispense and display audio cassettes.

2. Description of the Prior Art

Many cassette holders exist today for a variety of purposes. Devices which are designed to display audio cassettes typically comprise some sort of rectangular crevice which is able to hold audio cassettes stacked either horizontally or vertically.

Music stores and retail outlets most commonly store and display their audio cassettes stacked vertically on top of one another, as this is a relatively economical and space-saving design. Drawbacks to this configuration become apparent, however, when a consumer attempts to pull a cassette out from such a stack of cassettes. A common occurrence is that one or more of the cassettes directly above the desired cassette come out at the same time as a result of the inherent gravity effect of the vertical design.

An alternative design is one in which cassettes are placed horizontally on a shelf. Although this configuration effectively avoids the problems described above, it leaves gaps in the otherwise aesthetically pleasing linear placement of audio cassettes.

The attached prior art disclose various means of displaying and dispensing cassettes and other objects utilizing methods similar to that of the present invention. U.S. Pat. No. 4,769,573 to Celik discloses a tape cassette dispenser, this invention being the closest in both purpose and design to the present invention. U.S. Pat. No. 4,317,603 to Pepicelli et al. discloses a storage rack for video tape cartridges permitting storage of a plurality of cartridges in a close linear array and arranged for ease of individual selection. U.S. Pat. No. 4,134,495 to Friedman discloses single size display carton for packaging either a tape cassette or tape cartridge. U.S. Pat. No. 4,132,329 to Harrison discloses a dispenser for plastic cards which provides a sanitary protection to the cards yet enables the cards to be dispensed singly. U.S. Pat. No. 3,644,010 to Murphy discloses a tape cassette display fixture wherein tape cassettes are displayed in a manner which minimizes the possibility of theft while exhibiting tape cassettes in an attractive manner, facilitating observation of both sides of the cassette by potential purchasers.

Although prior art possess certain similarities in function and/or design to the present invention, it will be made apparent that the present invention possesses features of novelty not found in prior art.

SUMMARY OF THE INVENTION

The present invention relates to an audio cassette displayer and dispenser. The presently invented apparatus is comprised of transparent plastic dispenser which is designed to house a number of label-bearing cassette cases with audio cassettes disposed therein stacked vertically on top of one another. The height of the present invention may be modified according to the primary needs of consumers. An opening in the top of the present invention allows cassette tapes to be easily loaded within the apparatus. An opening on the bottom portion of the front wall of the present invention allows cassettes to be accessed and removed from the apparatus one at a time. After a single cassette has been removed, the remaining cassettes accordingly fall and fill the empty space previously occupied by the just-removed cassette. Impact-absorbing cushions are strategically positioned near each corner of the base of the present invention to prevent damage to cassettes dropped into the present invention while it is empty. Transparent slots exist on the outside of three of the walls of the present invention for additional labeling purposes.

Thus, it is a primary object of the present invention to provide a transparent device which is able to house audio cassettes stacked vertically on top of one another.

It is another object of the present invention to provide a device which holds audio cassettes housed within individual cases.

It is another object of the present invention to provide an opening in the front of the bottom area of said device large enough to dispense no more than one audio cassette.

It is another object of the present invention to provide impact-absorbing cushions strategically placed on the base of the present invention.

It is another object of the present invention to provide transparent slots on the outside of the walls of said device for holding labels or other informative matter.

It is another object of the present invention to provide an audio cassette displayer which is versatile in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
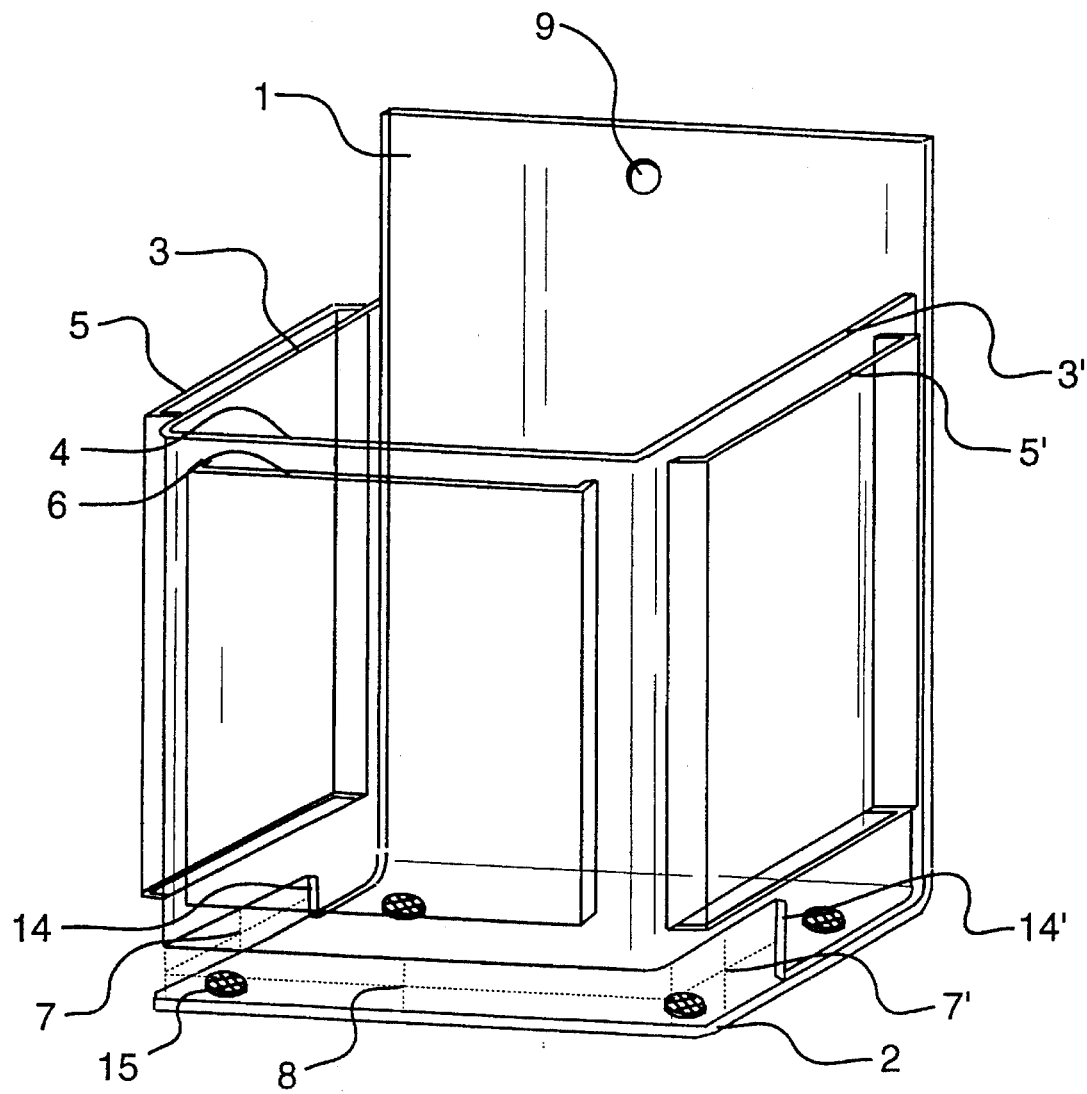
FIG. 1 is a perspective view of the present invention in an empty state.

Referring now to FIG. 1, a perspective view of the present invention is shown. It should be noted that all components of the present invention are molded of transparent plastic. A rear wall 1 extends upward from the rear edge of horizontal base 2. Side walls 3 and 3' extend forward from the sides of rear wall 1 and upward from the sides of horizontal base 2. A front wall 4 is formed between and connects the front edges of side walls 3 and 3'. Each of said side walls 3 and 3', as well as front wall 4, has an outer vertical slot 5, 5', and 6, respectively. A front access space 8 exists between the front wall 4 and front edge of the base 2. Recessed edges 14 and 14' exist at the bottom of each of the side walls 3 and 3', respectively, creating side access spaces 7 and 7', respectively. These side access spaces 7 and 7' are extensions in depth of the front access space 8 and effectively serve as areas available for fingers to grab a cassette.

An impact-absorbing cushion 15 is placed near each of the four corners of the upper surface of the base of the present invention for cushioning the fall of a cassette which is dropped into the present invention while it is empty. A hole 9 exists in the center of the top of the rear wall 1. This hole 9 is provided for suspension of the device from a nail or a screw on a wall. Other means of suspension, of course, may be alternatively utilized.

Figure 2:
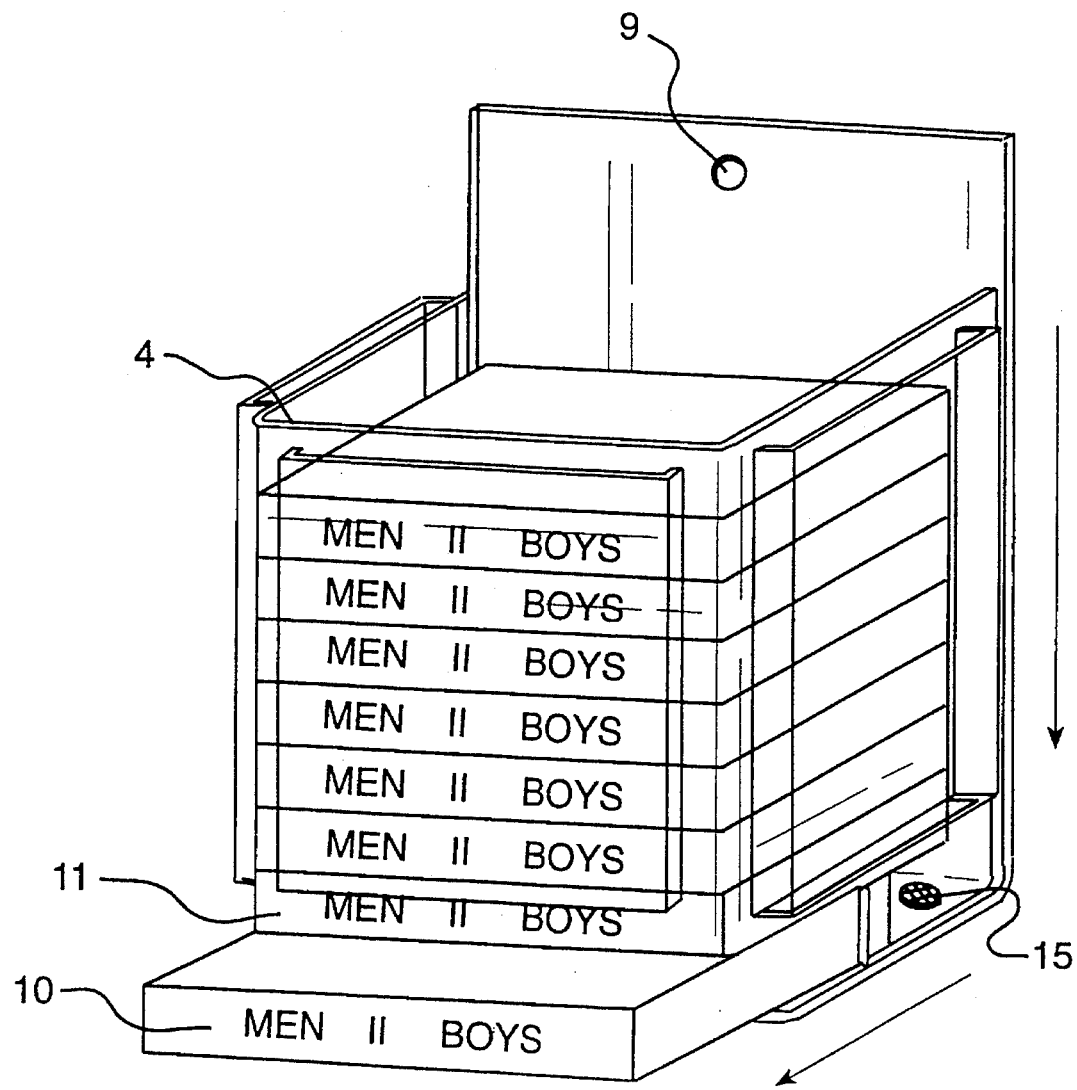
FIG. 2 is a perspective view of the present invention demonstrating the process of dispensing audio cassettes.

Referring now to FIG. 2, the present invention is shown filled with a typical stack of audio cassettes. Each of these cassettes is individually housed within a label-bearing case, making it very easy for a consumer to identify each cassette housed within the device. The bottom-most cassette 10 is shown being pulled out from the present invention through the opening which is created by the front access space 8 and side access spaces 7 and 7' as labeled in FIG. 1. This opening is large enough for passage of one and only one cassette at a time. When the bottom-most cassette 10 is fully removed, gravity will naturally cause the cassettes above the bottom-most cassette 10 to fall and fill the empty space which is created by the removal of the bottom-most cassette 10. Thus, the cassette 11 which was previously directly above the bottom-most cassette 10 accordingly becomes the new bottom-most cassette. This process may be repeated until the apparatus is completely empty.

While the removal process described above is suitable for use in a retail outlet where cassettes are sold, the present invention may also be used at home by consumers who wish to listen to a series of cassettes. In this case, once a consumer has listened to the first cassette of a series, he or she simply places it back into the top of the present invention. This process is then repeated until the first cassette returns to the bottommost position 10.

Figure 3:
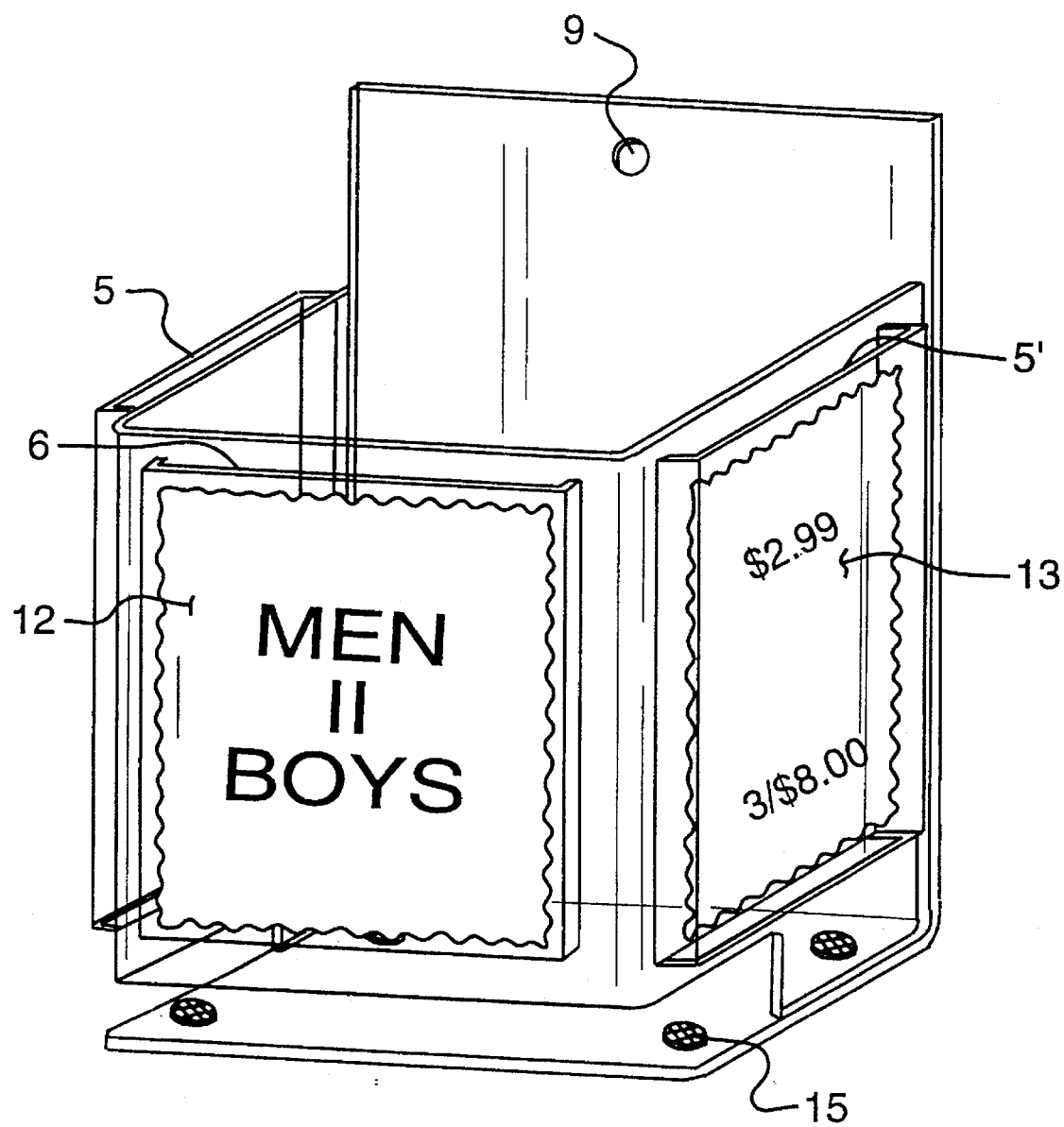
FIG. 3 is a perspective view of the present invention demonstrating potential uses of the slots of said invention.

Referring now to FIG. 3, sample uses for the vertical slots 5, 5', and 6 are shown. The vertical slots 5, 5', and 6 are intended for insertion of the cardboard cover commonly found within audio cassette cases. This is particularly useful when all of the cassettes housed within the device are the same. The slots may also be used to display other informative matter, such as a price label 13. The vertical slots 5, 5', and 6 are open at both the top and bottom for ease of removal. Although the slots are open at the bottom, the inherent thickness of cardboard covers will suspend them within said slots.

While the present invention has been disclosed with reference to a particular example of preferred embodiment, it is the applicant's intention to cover all modifications and equivalents within the scope of the following appended claims. It is therefore requested that the following claims be given a liberal interpretation which is within the spirit and scope of the applicant's contribution to this art.

What is claimed as being new and therefore desired to be protected by letter patent in the United States is as follows:

1. A transparent plastic audio cassette displayer and dispenser comprising:

a. a rectangular base slightly larger in both width and depth than the size of a case of a conventional audio cassette and having a front edge, rear edge, two side edges, upper surface, and lower surface;

b. a rear wall having a bottom edge, top edge, two side edges, front surface, and back surface, wherein a small hole is located at center of the top of said front surface of said rear wall, and wherein said rear wall extends perpendicularly upward from said rear edge of said base;

c. two side walls, each having a front edge, rear edge, top edge, bottom edge, and extending perpendicularly upward from said two side edges of said base and perpendicularly forward from said two side edges of said rear wall;

d. a front wall having a top edge, bottom edge, two side edges, and being formed between said front edges of said side walls;

e. a front space between said bottom edge of said front wall and said front edge of said base slightly larger than the height of a conventional audio cassette case;

f. a recessed edge at said bottom of each of said side walls creating an extension in depth of said space.

2. The transparent plastic audio cassette displayer and dispenser as set forth in claim 1 wherein an impact-absorbing cushion is placed near each corner of said upper surface of said rectangular base.

3. The transparent plastic audio cassette displayer and dispenser as set forth in claims 1 and 2 further comprising a vertical slot on the outside of said front wall and each of said side walls.

\* \* \* \* \*